(12) United States Patent
Bradley et al.

(10) Patent No.: US 6,785,703 B2
(45) Date of Patent: Aug. 31, 2004

(54) SIMULTANEOUS DUAL RAIL STATIC CARRY-SAVE-ADDER CIRCUIT USING SILICON ON INSULATOR TECHNOLOGY

(75) Inventors: Douglas Hooker Bradley, Austin, TX (US); Tai Anh Cao, Austin, TX (US); Robert Alan Philhower, Valley Cottage, NY (US)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 09/864,137

(22) Filed: May 24, 2001

(65) Prior Publication Data

US 2003/0005017 A1 Jan. 2, 2003

(51) Int. Cl.[7] .................................................. G06F 7/50
(52) U.S. Cl. ...................................... 708/702; 708/708
(58) Field of Search .............................. 708/700, 702; 326/52–55

(56) References Cited

U.S. PATENT DOCUMENTS

| | | | |
|---|---|---|---|
| 4,110,832 A | | 8/1978 | Leininger et al. |
| 4,562,365 A | * | 12/1985 | Redfield ...................... 326/55 |
| 4,667,303 A | * | 5/1987 | Pfennings ................... 708/702 |
| 4,710,650 A | * | 12/1987 | Shoji ............................ 326/98 |
| 5,218,246 A | * | 6/1993 | Lee et al. ...................... 326/55 |
| 5,491,653 A | * | 2/1996 | Taborn et al. ............... 708/702 |
| 5,539,332 A | * | 7/1996 | Schmookler ................ 708/670 |
| 5,875,124 A | * | 2/1999 | Takahashi ................... 708/702 |
| 6,003,059 A | * | 12/1999 | Bechade ..................... 708/702 |
| 6,055,557 A | | 4/2000 | Beck et al. |

OTHER PUBLICATIONS

IEEE, Sep. 1999, "The Novel Efficient Design of XOR/XNOR Function for Adder Applications", Cheng et al, pp. 29–32.
IEEE Transactions on Circuits and Systems II: Analog and Digital Signal Processing, May 2000, vol. 47, No. 5, A Novel High–Performance CMOS, 1–Bit Full–Adder Cell, Shams et al, pp. 478–481.
DAC 1998, Jun. 15–19, San Francisco, Arithmetic Optimization Using Carry–Save–Adders, Kim et al, pp. 433–438.

* cited by examiner

*Primary Examiner*—Tan V. Mai
(74) *Attorney, Agent, or Firm*—Mark E. McBurney

(57) ABSTRACT

An adder circuit is provided that generates the sum and sum complement (sum_) signals by constructing the logic in such a way that various levels of both N-type devices and P-type devices are both "on" at the same when that leg is to be open. The logic is then determined by another level and only one P or N type device is on at a given time. For carry and carry complement (carry_) signals a circuit is provided that is symmetrical with respect to P and N devices. The carry and carry_ signals are generated by inputting the complement signals to the same circuit used to generate the carry signal. The symmetrical P and N type devices are complementary in that associated devices are on or off with respect to each other. Both the carry and carry_ signals are concurrently output. The symmetric nature of the static, dual rail, simultaneous, sum and carry circuits will improve switching performance and minimize the floating body effect that can be found in silicon on insulator (SOI) devices.

14 Claims, 10 Drawing Sheets

SIMULTANEOUS DUAL RAIL STATIC CARRY-SAVE-ADDER CIRCUIT USING SILICON ON INSULATOR TECHNOLOGY

BACKGROUND OF THE INVENTION

1. Field of the Invention

The present invention relates to logic circuits utilized in data processing systems. More particularly, the present invention includes an improved adder circuit used in various of the functional components contained in a computer system.

2. Description of Related Art

With the continual advance of computer technology, more and more circuitry is being provided on each integrated circuit (IC), which makes them correspondingly more complex. All aspects of the computer system, such as operating system and application software, system hardware, circuit design and the like are influenced by this ever increasing demand for higher performance. In the area of circuit design, new technologies have been developed to create more efficient integrated circuits in terms of speed and power consumption. One such technology is referred to as silicon-on-insulator (SOI). Basically, SOI refers to placing a thin layer of silicon on top of an insulator such as silicon oxide or glass. Transistors would then be built on top of this thin layer of SOI. The basic idea is that the SOI layer will reduce the capacitance of the switch, so it will operate faster. Due to the fact that the semiconductor sits on an insulator, the voltage drop across the transistor tends to vary. This situation is often referred to as the floating body effect and can have an effect on the switching times of SOI devices. Additionally, it has been discovered that N-channel type devices can experience scaling problems when implemented in SOI technology. This is due to the fact that N-type devices typically have a significant amount of electrical charge stored in the body of the device. As used herein, scaling refers to the ability to apply successive generations of process technology to the same circuit design. Based on the above, it can be seen that it would be advantageous to minimize the number of N-type devices that are present in SOI circuits. Further, it would be beneficial to balance any N-type devices with P-type devices such that the circuit configuration is symmetrical. That is, for sum circuits the N-type and corresponding P-type devices are on at the same time to minimize the floating body effect in SOI circuits, while for carry circuits the N-type and corresponding P-type devices would be on or off respectively to improve SOI performance.

In addition to scaling problems, the prior art often places too much dependence on gate voltage as a factor in increasing circuit speed. More specifically, in conventional circuits, such as Complementary Pass gate Logic (CPL), when a logic "1" is pushed through the source/drain of an N-channel type device, only a voltage of VDD−Vtn (VDD minus Vtn) is created at the other end (drain/source respectively), where Vtn is the threshold voltage of N-channel device. This Vtn voltage is restored through an inverter having a weak P-channel and strong N-channel type devices.

The speed of CPL circuit is very dependent on the "high" voltage that is applied to the gate of N-channel device to turn it on (conduct electricity) because of the following reasons: a) the higher the voltage applied to the gate, the harder (fast and distinct switching) the N-channel device is turned on and hence, the resistance is less and so is the RC component; b) the higher voltage applied at the gate, the higher the VDD−Vth voltage is with respect to the voltage appearing that the other end of the transistor (i.e. source or drain, respectively); and c) the higher the voltage VDD−Vtn, the easier it is to create a logic "0" at the output of the inverter because the |Vgs| of the N-channel device of the driving inverter is bigger.

The above described process means that the higher the "high" voltage in CPL circuits causes faster switching times. The converse is also true. That is, the lower the "high" voltage applied at the gate creates an avalanche effect, making the CPL circuit much slower. In the extreme case, if the VDD−Vtn voltage drops too much, it cannot even change the state of the inverter to create a logic "0" output.

On the chip, there are many sources that can cause the "high" voltage to be at a lower voltage level, such as couple noise, delta-I noise, and dc voltage drop. Further, with respect to SOI circuits, where the semiconductor sits on an insulator, the voltage drop across a transistor tends to vary. This situation is often referred to as the floating body effect (history effect) and can have a significant impact on the switching times of SOI devices.

The above description demonstrates the problems that can be encountered when modeling SOI circuits which in turn makes predicting circuit speeds difficult. As the result, the speed at which the device including the SOI circuits, such as a microprocessor, is expected to operate is difficult to determine with any certainty. As noted above, scaling means applying successive generations of process technology to the same circuit design. Unfortunately, for conventional SOI circuits, successive generations of process technology tends to mean that supply voltages (VDD) will be lower. Those skilled in the art will understand that supply voltages tend to become lower as process technology advances. Because of this fact, the speed of SOI circuits using complementary pass gate logic does not scale well when compared to other circuit families.

Thus, it would be beneficial to have circuits that are scaled well with successive generations of process technology wherein the circuit switching speed is not so dependent to gate voltage.

Adder circuits have been a major building block of computer systems for many years. In basic terms, adders are generally used to add two binary numbers and output the sum digit and a carry digit. Typically, the sum and carry digits are added to a subsequent stage and the process continues until all of the bits representing the numbers being added are summed. Several types of adders are widely known, including ripple carry adders, carry propagate adders and carry save adders (CSA). It is well known in the art that multipliers operate by performing multiple add and shift operations. Multipliers are often a component of an arithmetic logic unit (ALU) included in an execution unit of a microprocessor. For example, a fixed point, or integer unit in a microprocessor core that executes arithmetic instructions, such as multiply, add, divide, will include adders. Carry save adders are commonly used in high speed multipliers where they are generally able to function more rapidly than the other types of adders mentioned above. This is due to the fact that a CSA does not completely perform the relatively time consuming process of combining carries with sum bits between successive additions in the multiplication process, but instead defers this task until the final cycle of the multiplying operation. Typically, the partial products generated at each stage are then summed by carry save adders. The equations of sum and carry are outlined as follows:

$$\text{sum} = a'b'c + ab'c' + a'bc' + abc \quad (1)$$

$$\text{carry} = a'bc + ab'c + abc' + abc \quad (2)$$

From these equations it can be seen that both true and complement signals are needed. Conventional techniques provide a circuit that generates a true signal and then merely adds an inverter to its output to generate the complement signal. Those skilled in the art will understand that the timing of these signals is such that the true signal will always be available before the complement signal. Thus, the true signal will have to be latched for a period of time while the complement signal develops. This not only causes increase time for the sum and carry to be generated, but also adds complexity to the design, since an accumulator, or the like must be included to store the signals while the complement develops. Further, conventional dual rail circuits, such as dual dynamic or dual rail regenerative cross-couple (RCPL) circuits have been used as adders. However, those skilled in the art will appreciate that the design of dynamic circuits requires special attention must be given to the macro interfaces and clocking due to the timing considerations. Further, RCPL circuits do not scale well with the new technologies, e.g SOI, particularly in the area of power distribution.

Therefore, it can be seen that it would be beneficial to have a static adder circuit that generated both the true and complement signals and made them available for processing the same time. That is, it would be advantageous to have a simultaneous dual rail (true and complement) circuit that generates the true and complement signals concurrently so they are available for processing in accordance with equations (1) and (2), above.

SUMMARY OF THE INVENTION

In contrast to the prior art, the present invention is a simultaneous dual rail, static, full adder circuit that balances the N-type and P-type devices to enhance the SOI technology.

Broadly, the present invention is an adder circuit that generates the sum and sum complement (sum_) signals by constructing the logic in such a way that at the first two levels both the N-type devices and P-type devices are on at the same when that leg is to be open. The logic is then determined by a third level and only one P or N type device is on at a given time. For carry and carry complement (carry_) signals a circuit is provided that is symmetrical with respect to P and N devices. Thus, carry_ is generated by inputting the complement signals to a mirror of the same circuit used to generate the carry signal.

Therefore, in accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

Figure 1:
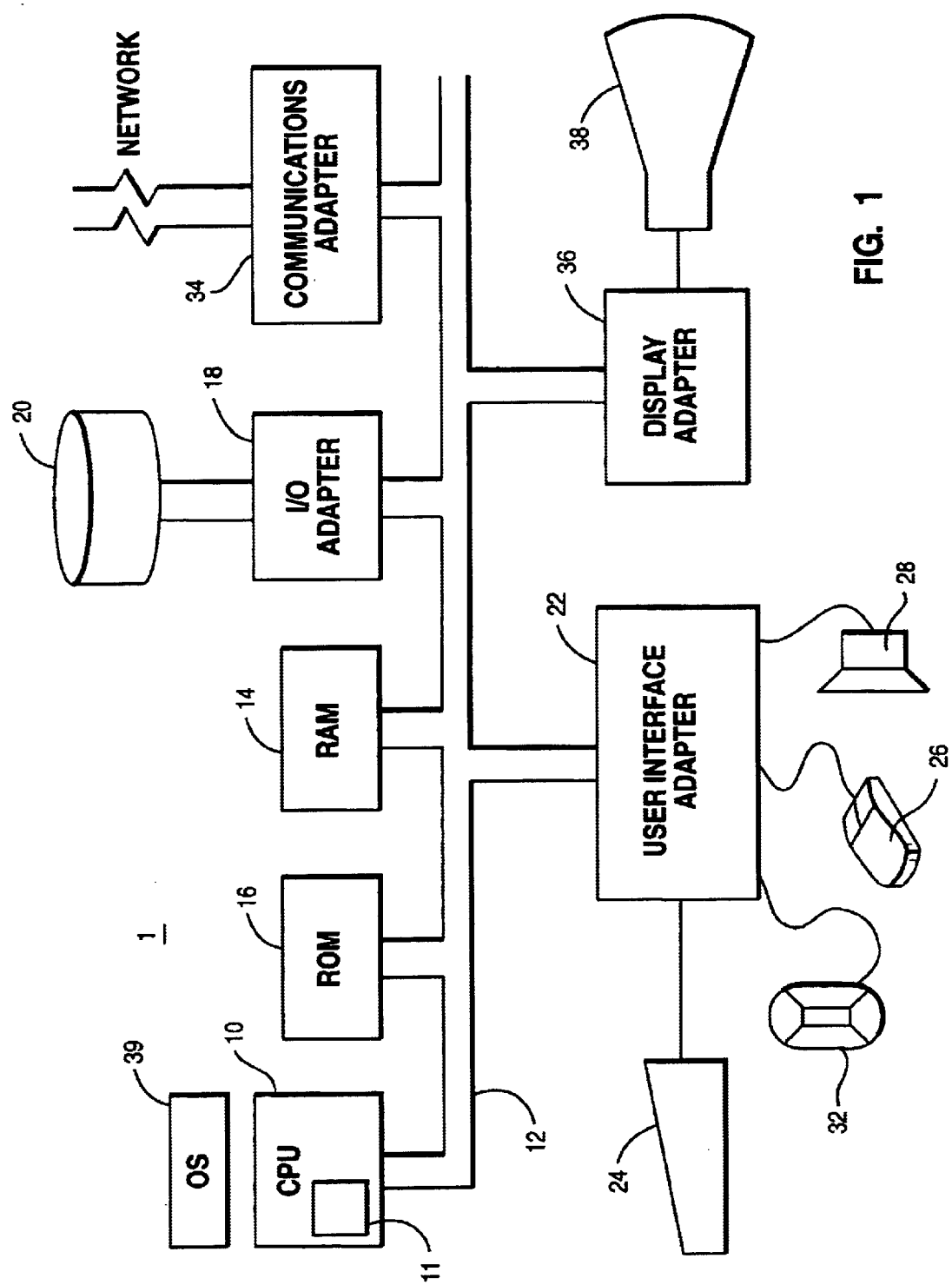
FIG. 1 is a block diagram of an overall computer system which would include the present invention as a circuit in, for example, a functional unit of the CPU.

Referring to FIG. 1, a typical data processing system 1 is shown which may be used in conjunction with the present invention. A central processing unit (CPU) 10 may include, for example, a PowerPC microprocessor, commercially available from the IBM Corporation or a Pentium class microprocessor, available from Intel Corporation interconnected to the various other system components by a system bus 12.

An execution unit 11 is shown as being included in CPU 12. Such execution units are basically arithmetic logic units (ALU) that perform the logical and arithmetic operations used by the microprocessor to run the software programs operating on CPU 12. Typical execution units include floating point units, fixed point (integer unit), branch units, and the like. These execution units will include multipliers that receive machine instructions and perform add and shift operations to implement the multiplication operation. The present invention is an improved full adder circuit that will be particularly useful when utilized by the multipliers included in the execution units of CPU 12. Of course, this is just one example of the usefulness of the adder circuit of the present invention. Those skilled in the art will appreciate that the use of adder circuits is widespread throughout logic circuits and the present invention can be used to improve the performance of many other different components which make up a data processing system 1.

Read only memory (ROM) 16 is connected to CPU 10 via bus 12 and includes the basic input/output system (BIOS) that controls the basic computer functions. Random access memory (RAM) 14, I/O adapter 18 and communication adapter 34 are also connected to system bus 12. I/O adapter 18 may be a small computer system interface (SCSI) adapter that communicates with a disk storage device 20. Communications adapter 34 may be a network card that interconnects bus 12 with an outside network. Adapter 34 may also include an I/O port that allows a connection to be made, through a modem 40, or the like to enable the data processing system to communicate with other such systems via the Internet, or other communications network (LAN, WAN). User input/output devices are also connected to system bus 12 via user interface adapter 22 and display adapter 36. Keyboard 24, track ball 32, mouse 26 and speaker 28 are all interconnected to bus 12 via user interface adapter 22. Display monitor 38 is connected to system bus 12 by display adapter 36. In this manner, a user is capable of inputting to the system through keyboard 24, trackball 32 or mouse 26 and receiving output from the system via speaker 28 and display 38. Additionally, an operating system (OS) 39, such as the DOS, OS/2, Windows operating system, or the like is shown running on CPU 10 and used to coordinate the functions of the various components shown in FIG. 1.

Figure 2:
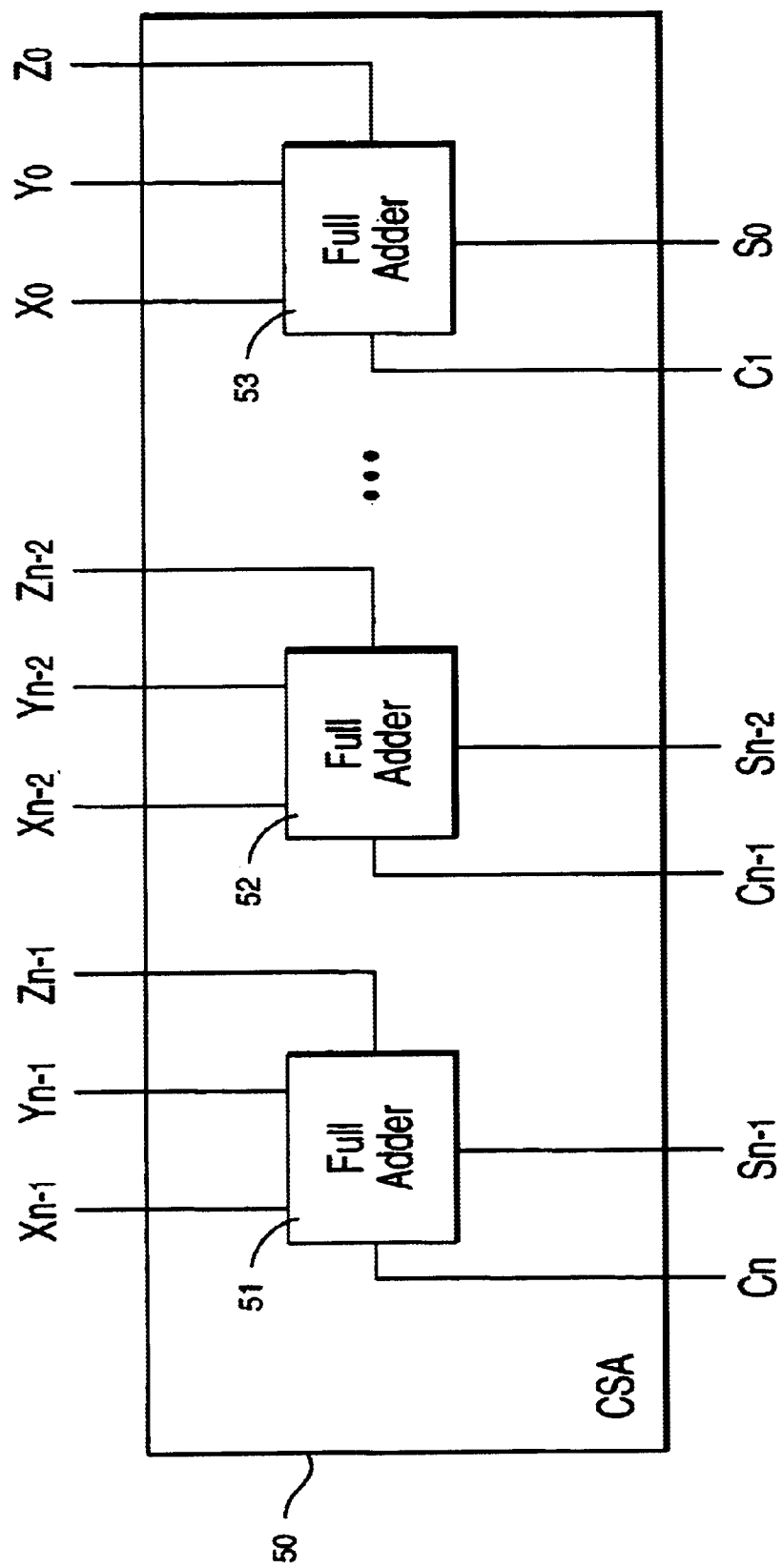
FIG. 2 block diagram of a carry save adder, including n full adders, in accordance with the present invention.

Referring to FIG. 2, a carry save adder (CSA) 50 is shown having full adder circuits 51, 52, 53. Each of these adder circuits receive three (3) inputs $X_{n-1}, Y_{n-1}, Z_{n-1}$; $X_n, Y_n, Z_n$; and $X_0, Y_0, Z_0$, respectively. Adders, 51, 52, 53 each also have two (2) outputs, $C_0, S_{n-1}$; $C_{n-1}, S_{n-2}$; and $C_1, S_o$, respectively. CSA 50 consists of n disjoint full adders and consumes three input value and produces two outputs, i.e. sum (S) and carry (C). Unlike other types of adders, e.g. ripple carry adders, carry lookahead adder and the like, the CSA contains no carry propagation. Consequently, the CSA has the same propagation delay as one full adder. As noted above, the CSA of FIG. 2 is likely to be used in a multiplier circuit found in one of the execution units 11 of CPU 12.

Figure 2A:
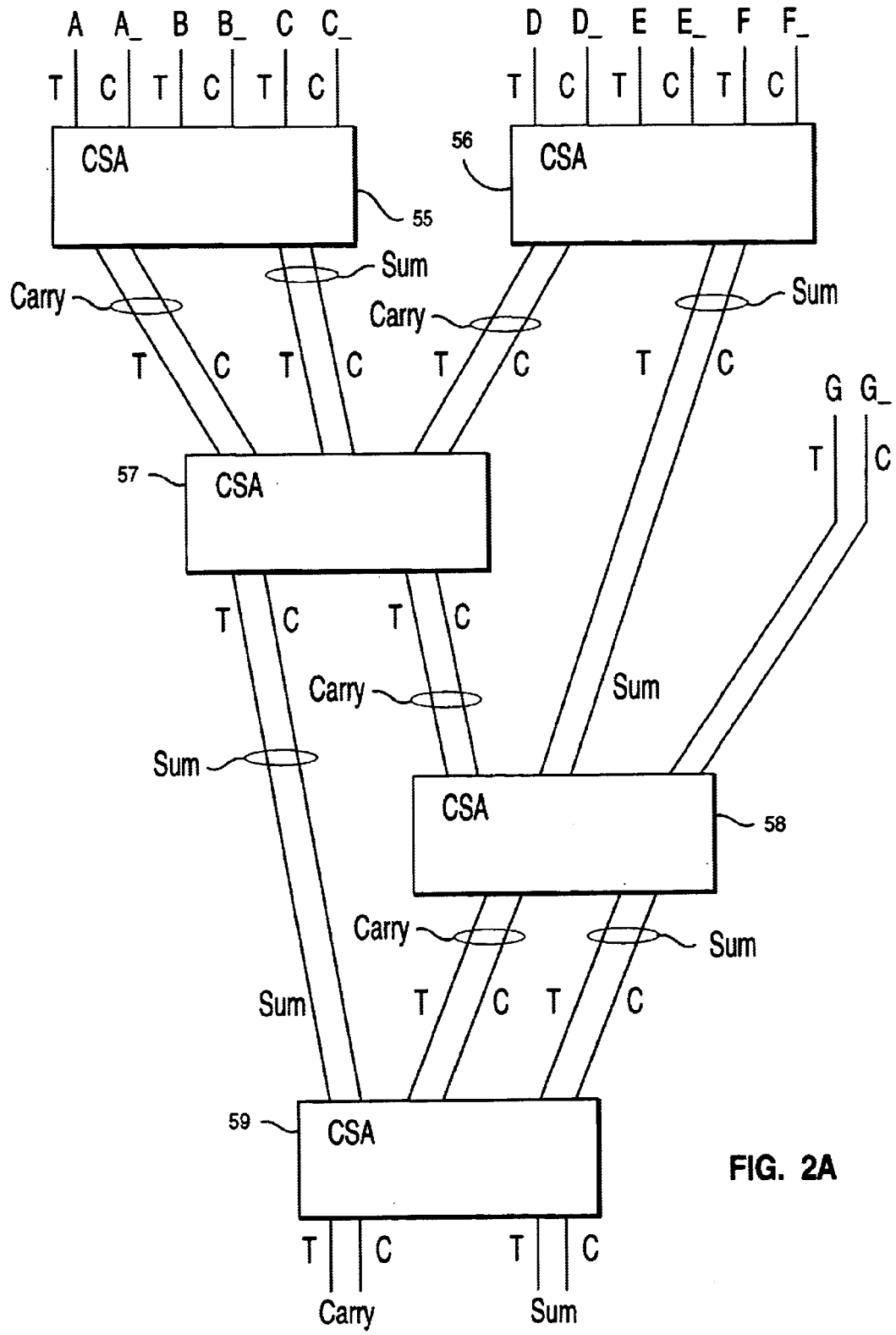
FIG. 2A is another block diagram of a CSA adder circuit which illustrates the advantage of the simultaneous dual rail aspect of the present invention
Figure 3:
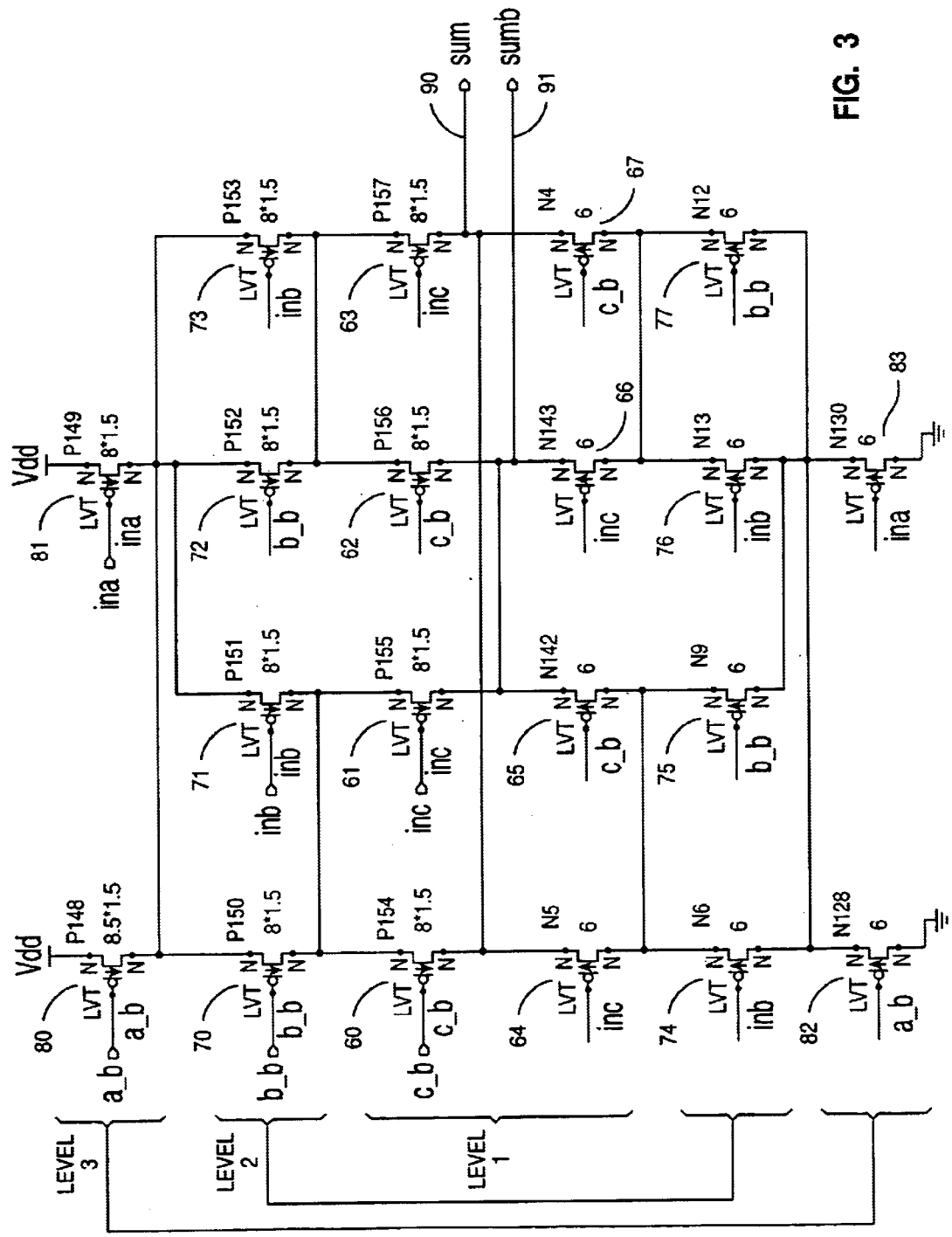
FIG. 3 is a schematic of a summing circuit utilized by a first preferred embodiment of the present invention which outputs sum and sum complement (sum_) signals.
Figure 4A:
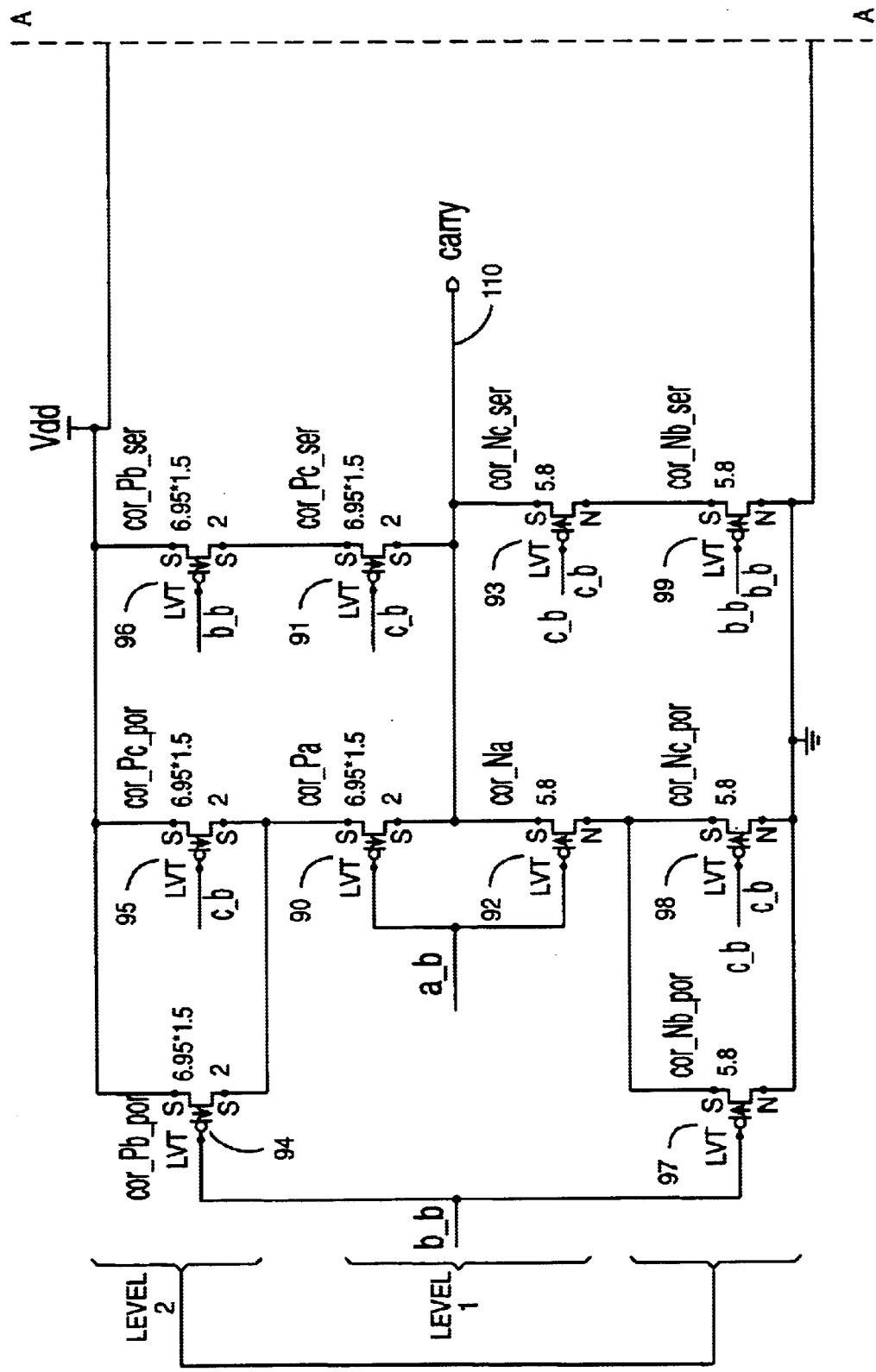
FIG. 4 (comprised FIGS. 4A–4B) is a schematic of a circuit which outputs carry and carry complements (carry_) signals used by the adder of the first embodiment of the present invention.
Figure 4B:
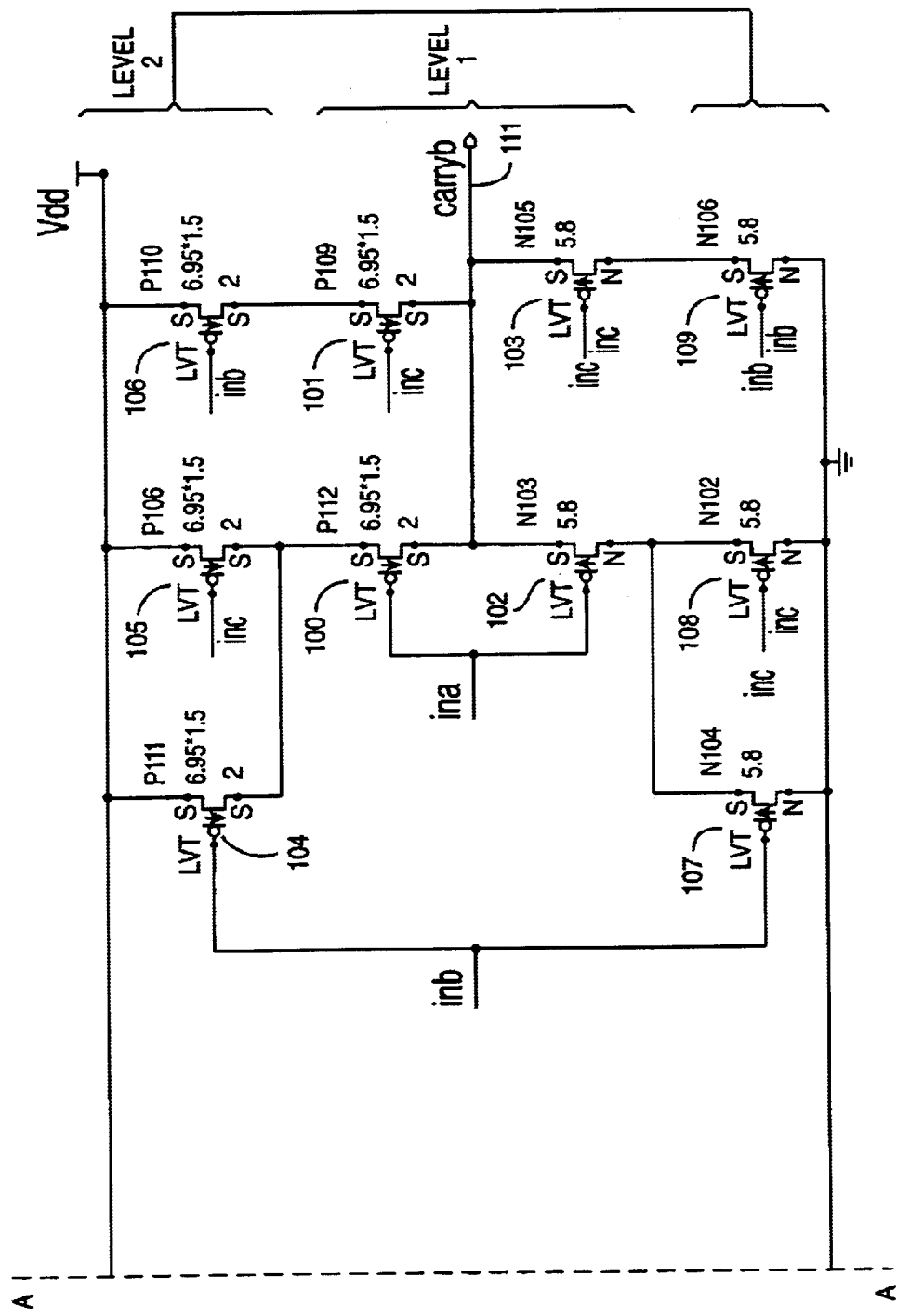
Figure 5A:
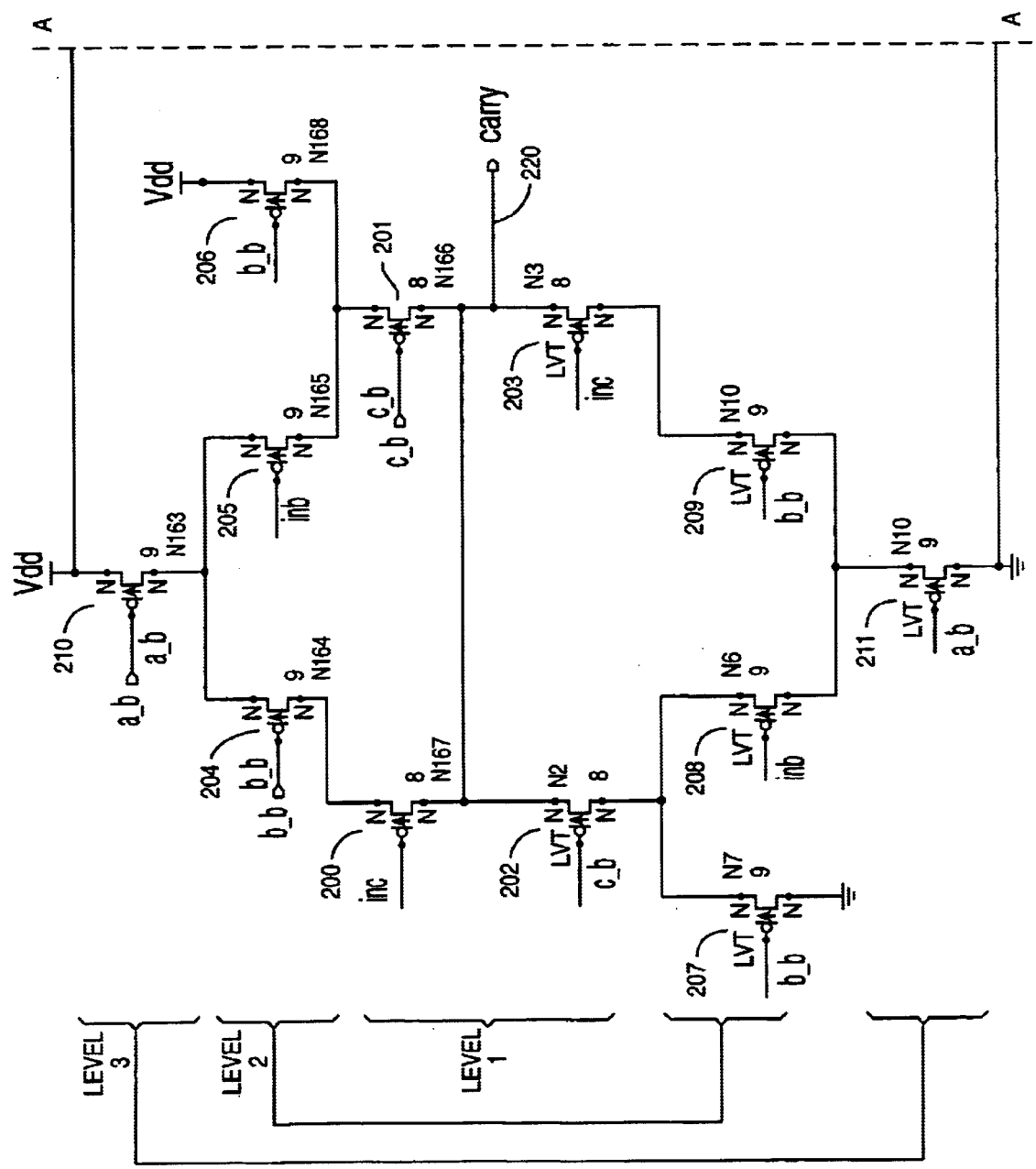
FIG. 5 (comprised FIGS. 5A–5B) is another schematic diagram of a carry circuit in accordance with a second embodiment of the present invention to output carry and carry_ signals for use by an adder unit, such as shown in FIG. 2.
Figure 5B:
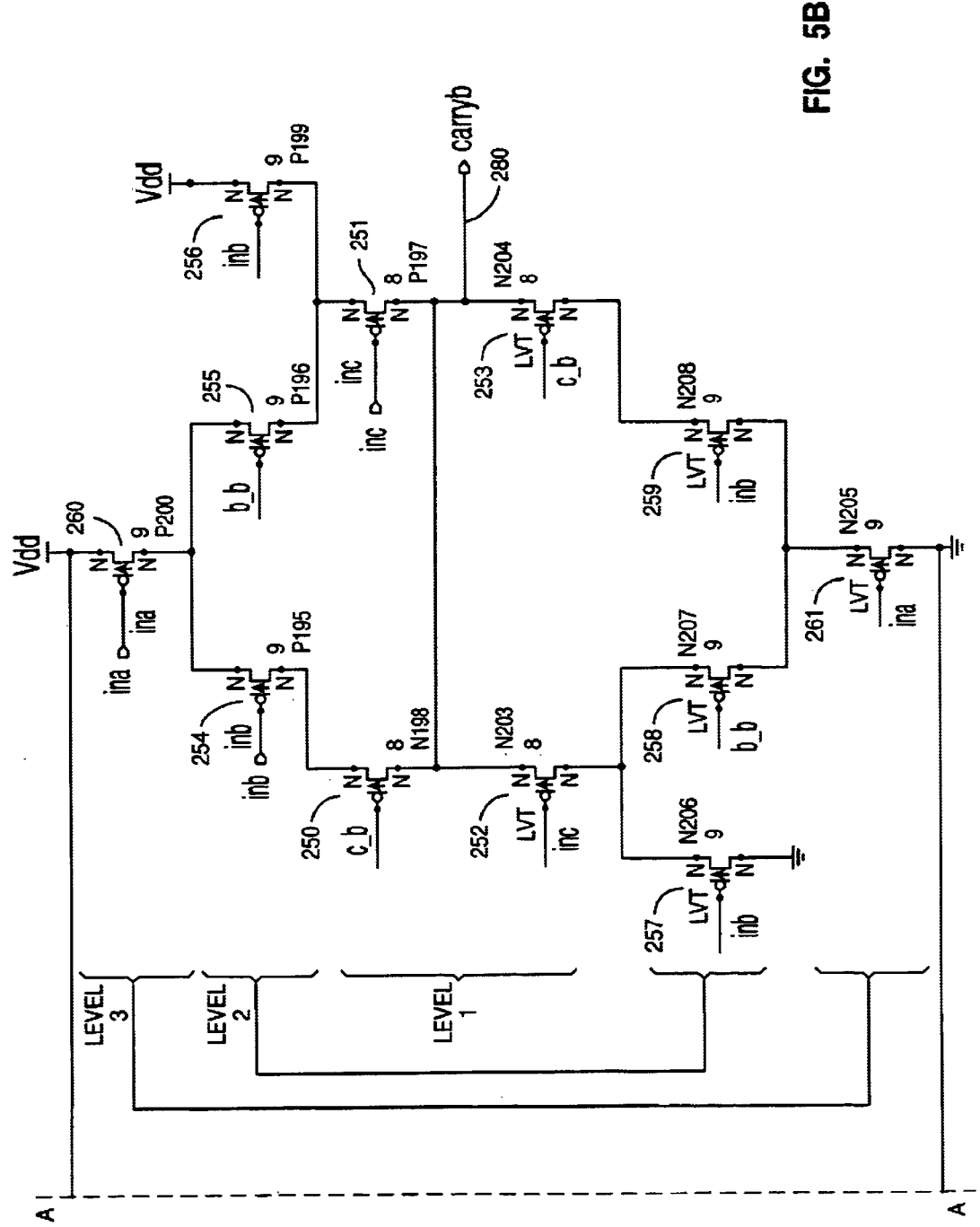

FIG. 2A shows the critical path (longest delay) of this circuit travels through four carry save adders, e.g. 55, 57, 58 and 59. In each of these CSA cells, the sum and the carry are generated by equations (1) and (2), as previously shown The sum circuit, subsequently described in conjunction with FIG. 3, which executes equation (3) and the carry circuits described below with FIGS. 4 and 5 that execute equation (4) both need the true and complement inputs (a and a', b and b', c and c'). Since the circuits shown in FIGS. 3–5 are symmetrical with respect to the true and complement inputs, whichever input signal, either true or complement that arrives last will determine the timing of the critical path. In other words, if both true and complement input signals arrive at the same time the critical path will be determined by both the true and complement inputs. However, in the single rail version, each CSA cell in FIG. 2A would need an inverter to generate the complement signal (e.g. a') from the true signal (e.g. a), or vice versa. Since there are four CSAs in series in the circuit of FIG. 2A, then there are four inverters in the critical path which are used to generate the complement. It can be seen that these series inverters will cause timing delays which force the output signals to wait while the signal is inverted to generate the true/complement output signals for use at the next stage, where the delay is again encountered due to its CSA's inverter. Further, this delay increases in proportion to the number of CSA stage provided in the circuit.

In simultaneous dual rail circuits, such as shown in FIG. 2A, both the true and complement outputs (sum and sum', carry and carry') are generated at the same time and provided as inputs to the next CSA stage. Since an inverter is not needed to generate the complement in dual rail circuits, they can be removed from the CSA cell. In the circuit of FIG. 2A, four inverters, and their associated delay, are taken out of the critical path when the dual rail inputs (both true and complement) are provided to the CSA in the first stage of the circuit.

More particularly, it can be seen from FIG. 2A that the true and complement inputs are provided to the first stage CSAs, such as shown by CSA 55. In this case the signals a/a__, b/b__ and c/c__ are provided with a corresponding carry/carry__ and sum/sum__ output therefrom. Without the dual rail characteristic of the present invention, a single carry and sum output would be provided with a corresponding inverter (and its associated timing delay) that would provide the carry__ and sum__ signals, respectively.

Therefore, it can be seen how the dual rail aspect of the sum and carry circuit of the present invention will increase performance by eliminating delay associated with the inclusion of an inverter which is necessary to generate complement signals when utilizing single rail circuits.

In accordance with the present invention, FIG. 3 shows a sum circuit included in one of full adders (FA) 51, 52, 53 of CSA 50 of FIG. 2. The sum circuit of FIG. 3, which generates the sum and sum complement signals, is structured as three (3) levels. The logic is constructed in a way that at levels 1 and 2 (c__b, inc and b__b, inb) both the N and P devices are "on" at the same for one leg, if that leg is to be open. The logic (output of sum and sum__) is determined by the third level inputs ($a_{13}$ b, ina). With this structure, one and only one device (either P or N) is on. It should be noted that for the purposes of describing the present invention, ina, inb and inc are used to represent the input signals a, b, c. Further, a__b, b__b, c__b are used herein to represent the complement of a, b, c. For example, a__b is the complement of signal a, where "b" is used to represent the underscore, i.e. "a bar" where the "b" stands for bar, or underscore.

At levels 1 and 2, P devices always have inputs that are inverted from the ones of the N devices. At the third level both P and N type devices have the same input. More particularly, level 1 includes P type devices 60, 61, 62, 63 and N type devices 64, 65, 66, 67. Those skilled in the art will understand that P type devices include transistors that conduct electricity through their source and drain when a ground potential (logical 0) is present at its gate. N type devices include transistors that conduct electricity through their source and drain when a voltage (logical 1) is present at its gate. Level 2 includes P type devices 70, 71, 72, 73 and N type devices 74, 75, 76 and 77.

The operation of the circuit of FIG. 3 will now be described. It can be seen that the P type devices shown in FIG. 3 have corresponding, or associated, N type devices such that the P and N transistors are connected symmetrically. In level 1, P devices 60, 61, 62 and 63 are coupled with corresponding N devices 64, 65, 66 and 67, respectively. The input signals to the set of P devices alternates between c__b and c, while the input to the N devices alternates between c and c__b. In this manner, the devices of level 1 are symmetrical such that for a combination of c and c__b, each P device that is turned on (logical 0 input) its corresponding N device will also be turned on (logical 1 input). For a specific example, assume that inc=0 and c__b=1. In this case P type transistor 60 will have a logical 1 at its gate and N type transistor 64 will have logical 0 input to its gate. Thus, both corresponding P and N type transistors 60 and 64 will be off. For P and N transistors 61 and 65, a logical 0 (inc) will be input to P type device 61 and a logical 1 (c__b) will be input to N type device 65. In this case, both P and N type device 61 and 65 will be turned on. Similarly, for transistors 62 and 66, a logical 1 will be input to P type transistor 62 and logical 0 input to N type transistor 66. This causes both P and N transistors to be turned off. Finally, with a logical 0 (inc) input to P type transistor 63 and a logical 1 (c__b) input to N type transistor 67 both of these corresponding transistors will be turned on. Thus, it can be seen that for level 1, each N and P device have a corresponding P and N device that will mirror its operation.

In level 2, P devices 70, 71, 72 and 73 are coupled with corresponding N devices 74, 75, 76 and 77, respectively. The input signals to the set of P devices alternates between b__b and b, while the input to the N devices alternates between b and b__b. In this manner, the devices of level 2 are symmetrical such that for a combination of b and b__b, each P device that is turned on (logical 0 input) its corresponding N device will also be turned on (logical 1 input). For a specific example, assume that inb=0 and b__b=1. In this case P type transistor 70 will have a logical 1 at its gate and N type transistor 74 will have logical 0 input to its gate. Thus, both corresponding P and N type transistors 70 and 74 will be off. For P and N transistors 71 and 75, a logical 0 (inb) will be input to P type device 71 and a logical 1 (b__b) will be input to N type device 75. In this case, both P and N type device 71 and 75 will be turned on. Similarly, for transistors 72 and 76, a logical 1 will be input to P type transistor 72 and logical 0 input to N type transistor 76. This causes both P and N transistors to be turned off. Finally, with a logical 0 (inb) input to P type transistor 73 and a logical 1 (b_b) input to N type transistor 77 both of these corresponding transistors will be turned on. Thus, as with level 1, it can be seen that for level 2, each N and P device have a corresponding P and N device that will mirror its operation.

For level 3, P transistor 80 and N transistor 82 each receive the a complement signal (a_b) and P transistor 81 and corresponding N transistor 83 receive the a signal (ina). Since level 3 determines the logical output of the sum circuit, the associated N and P devices will not necessarily be on or off at the same time. For example, when ina=0 and a_b=1, P device 80 will be off (logical 1 input) and N device 82 will be on (logical 1 input). Similarly, P device 81 will be on (logical 0 input) and N device 83 will be off (logical 0 input).

Next, an example of the sum circuit of FIG. 3 will be provided using various inputs for a, b and c. The truth table for this circuit is provided below.

TABLE 1

| a | b | c | sum | sum_ |
|---|---|---|-----|------|
| 0 | 0 | 0 | 0 | 1 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 0 |

For the case where a, b, c, are all equal to logical 0, the input to N type transistors 64 and 74 (inc and inb) is logical zero and these devices will be turned off. Correspondingly, the input to P devices 60 and 70 (b_b and c_b) will be a logical 1 and these transistors will also be turned off. Thus, there is not an electrically conductive path through these transistors (70, 60, 64, 74).

The input to P transistors 61 and 71 is logical zero (inc and inb) and these devices will be turned on, and the input to N devices 65 and 75 (c_b and b_b) will be a logical 1 and these transistors will also be turned on. Thus, an electrically conductive path does exist through transistors (71, 61, 65, 75).

A logical one will be input to P type transistors 72 and 62 (b_b and c_b) such that they remain turned off, while a logical 0 is input to N type transistors 66 and 76 (inc and inb) causing them to also be turned off. Therefore, an electrically conductive path is not present through transistors, 72, 62, 66 and 76.

For the case of P type transistors 73, 63 a logical 0 (inb and inc) will be input thereto causing them to be in a turned on condition. A logical 1 (c_b and b_b) will be input to transistors 67 and 77 such that they will also be turned on. In this instance, an electrically conductive path is present through transistors 73, 63, 67 and 77.

Next, at level 3, a logical 1 (a_b) is input to P transistor 80 and N transistor 82. This input signal will cause transistor 80 to remain in a nonconductive state, but cause N transistor 82 to be turned on and conduct electricity. A logical 0 (ina) is input to P type device 81 and N device 83. This reference voltage input will cause transistor 81 to be turned on and conduct electricity while transistor 83 remains in a non-conductive state. Thus, associated transistors 880, 83 and 81, 82 will be on, or off, at the same time.

Therefore, it can be seen that with the inputs signals a=b=c=0, the P transistors 81, 71 and 61 are turned on creating an electrical path from Vdd to node 91 such that sumb is pulled up to Vdd and a logical one is output. Also, N transistors 83, 77 and 67 are turned on and will conduct electricity thereby pulling node 90 down to ground potential and cause the sum output to be a logical 0.

For the case where a=b=c=1, P type transistors 80, 70, 60 will all have a logical 0 input to them (a_b, b_b, c_b) and be in a turned on state. Thus, node 90 will be pulled up to Vdd and a logical one will be output. At the same time, N type transistors 83, 76 and 66 will have a logical one input causing them to be in a turned on state which will pull node 91 down to ground. In this case, sum will be a logical 1 and sumb will be a logical 0.

Thus, it can be seen that a full complementary, static, dual rail, sum and sum_ circuit is provided in accordance with a preferred embodiment of the present invention which allows less variability in Vdd voltage levels that improves the floating body issues present with silicon on insulator circuit technology. Further, the switching performance is improved by having the transistors connected symmetrically, wherein all P type devices and their associated N type devices are either on or off at the same time. The dual rail aspect of the invention lies in its ability to generate the sum and sum_ signals simultaneously on two output nodes, e.g. 90 and 91 as shown in FIG. 3.

Referring to FIG. 4, a full complementary, static, carry circuit in accordance with a preferred embodiment of the present invention is shown and will now be described. Again, it can be seen that the P type devices and N type devices are symmetrical with one another which will greatly improve the floating body problem associated with SOI circuits. More particularly, in level 1, P type devices 90 and 91 are included and symmetrically placed with N type devices 92 and 93 in the carry circuit of FIG. 4. In Level 2, P type devices 94, 95 and 96 are symmetrically placed in accordance with N type devices 97, 98 and 99.

Further, the circuit of FIG. 4 also outputs a carry_ signal wherein the P type devices and N type devices are symmetrical with one another. At level 1, P type devices 100 and 101 are in symmetrical connection with N type devices 102 and 103. At level 2, P type devices 104, 105 and 106 are symmetrical with N type devices 107, 108 and 109.

Those skilled in the art will understand that the carry equation can also be written in the following form.

$$\text{carry} = ab + bc + ca \qquad (3)$$

The carry and carry_ circuit of FIG. 4 will implement the carry operation in the manner as described by equation (3) and is symmetrical with respect to the number of included P and N type devices. Thus, the carry_ signal is generated by simply inverting all of the inputs in the used to generate the carry signal. That is, the carry_ portion of the circuit of FIG. 4 mirrors the carry portion, i.e. they are structurally the same, with the input values being inverted with respect to one another. Typically, nine (9) partial products need five (5) CSAs to sum the values. The carry and carry_ outputs are generated faster than the sum and sum_ outputs since the sum and sum_ circuit of FIG. 3 includes three levels, while the carry and carry_ circuit of FIG. 4 has two levels. Thus, the carry and carry_ outputs should be connected to the ina and a_b inputs to the next carry save adder, respectively. This will reduce the number of delay stages by four. Note that for the CSAs in the first stage, the true and complement may have to be generated locally by the inverters.

The truth table for carry and carry_ is shown below.

TABLE 2

| a | b | c | carry | carryb |
|---|---|---|-------|--------|
| 0 | 0 | 0 | 0 | 1 |
| 0 | 0 | 1 | 0 | 1 |
| 0 | 1 | 0 | 0 | 1 |
| 0 | 1 | 1 | 1 | 0 |
| 1 | 0 | 0 | 0 | 1 |
| 1 | 0 | 1 | 1 | 0 |
| 1 | 1 | 0 | 1 | 0 |
| 1 | 1 | 1 | 1 | 0 |

As an example of the operation of the circuit of FIG. 4, assume that the a=1, b=0 and c=0 are used as inputs. In this manner, a logical 0 (a_b) will be input to P transistor 90 and N transistor 92 and a logical 1 (b_b) will be provided to P transistor 94 and N transistor 97. The inputs to remaining P transistors 95, 96 and 91 will all be a logical 1 (b_b and c_b). Similarly, N transistors 97, 98, 99 and 93 will also have a logical 1 as their input (b_b and c_b). However, N transistor 92 will have a logical 0 (a_b) input thereto causing it to be turned off. Therefore, P type transistors 94, 95, 96 and 91 will all be in a nonconductive state, while N type transistors 97, 98, 99 and 93 will all be turned on and conduct electricity since a logical 1 (b_b and c_b) are input thereto. For this case, node 110 will be pulled to ground potential and the carry bit output from the circuit of FIG. 4 will be 0, in accordance with the truth table shown above.

Next, the operation of the circuit of FIG. 4 with respect to the carry_ output will now be described using the same assumptions described above, i.e. a=1, b=0, c=0. Thus, a logical 1 (ina) will be input to P transistor 100 and N transistor 102 and a logical 0 (inb) will be provided to P transistor 104 and N transistor 107. The inputs to remaining P transistors 105, 106 and 101 will all be a logical 0 (inb and inc). Similarly, N transistors 108, 109 and 103 will also have a logical 0 as their input (inb and inc). Since N transistor 102 has a logical 1 (ina) input thereto it will be turned on and conduct electricity. To summarize, P type transistors 104, 105, 106 and 101 will all have a logical 0 input thereto and be in a conductive state, while N type transistors 107, 108, 109 and 103 will all be turned off and be in a nonconductive state since a logical 0 (inb and inc) are input thereto. For this case, node 111 will be pulled up to the Vdd voltage level through P transistors 101 and 106 such that the carry_ bit output from node 111 will be a 1, in accordance with the truth table shown above.

It should be noted that conventional carry/carry_ circuits will typically add an inverter to the output of node 110 (carry) to generate the carry_ signal. It can be seen that this is not a true complementary circuits, as shown in FIG. 4, since the carry_ signal will always follow the carry signal causing increased switching times and decreased performance. However, the present invention provides a full complementary, dual rail carry/carry_ output circuit which simultaneously generates the carry and carry_ signals for use in the CSA of the present invention. The dual rail aspect being in that the carry and carry_ circuits are generated simultaneously on two output nodes, e.g. 110 and 111 as shown in FIG. 4. Thus, it can be seen that a full complementary, static, dual rail, sum and sum_ circuit is provided in accordance with a preferred embodiment of the present invention which allows less variability in Vdd voltage levels and improves the floating body issues present with silicon on insulator circuit technology. Further, the switching performance is improved by having the transistors connected symmetrically, wherein all P type devices and their associated N type devices are on or off, respectively at the same time.

FIG. 5 illustrates another preferred embodiment of the full complementary, static, dual rail, carry and carry_ circuit of the present invention which is structured in a manner similar to the sum and sum_ circuit of FIG. 3. The circuit of FIG. 5 provides advantages in that its structure is similar to the sum and sum_ circuit of FIG. 3 which may allow easier manufacturing. For certain applications this advantage may be offset by the fact that three (3) levels are present in the circuit of FIG. 5, while there are only two (2) levels present in the circuit of FIG. 4, which may allow the generation of the carry and carry_ signal to be faster.

In order to describe the operation of the circuit of FIG. 5 the same input assumptions will be used as those used in conjunction with the carry and carry_ circuits of FIG. 4, i.e. a=1, b=0, c=0. With regard to level 1 of FIG. 5, a logical 0 (inc) will be input to P type transistor 200 and N type transistor 203, with a logical 1 (c_b) being input to P type transistor 201 and N type transistor 202. At level 2, P type transistors 204, 206 and N type transistors 207, 209 will each receive a logical 1 (b_b). A logical 0 (inb) signal will be input to P type device 205 and N type device 208. At level 3, a logical 0 (a_b) will be input to P type device 210 and N type device 211. Therefore, it can be seen that N type transistors 207 and 208 will both be turned on to conduct electricity and node 220 will be pulled down to ground potential such that the carry bit output will be a logical 0 in accordance with the truth table shown in Table 2.

The generation of the carry_ signal by the circuit shown in FIG. 5 will now be described. At level 1, a logical 1 (c_b) will be input to P transistor 250 and N transistor 253, with a logical 0 (inc) being input to P transistor 251 and N transistor 252. At level 2, P type transistors 254, 256 and N type transistors 257, 259 will each receive a logical 0 (inb). A logical 1 (b_b) signal will be input to P type device 255 and N type device 258. At level 3, a logical 1 (ina) will be input to P type device 260 and N type device 261. Thus, it is apparent that P type transistors 251 and 256 will both be turned on to conduct electricity and node 280 will be pulled up to voltage Vdd such that the carry_ output bit will be a logical 1 in accordance with above truth table of Table 2.

Figure 6A:
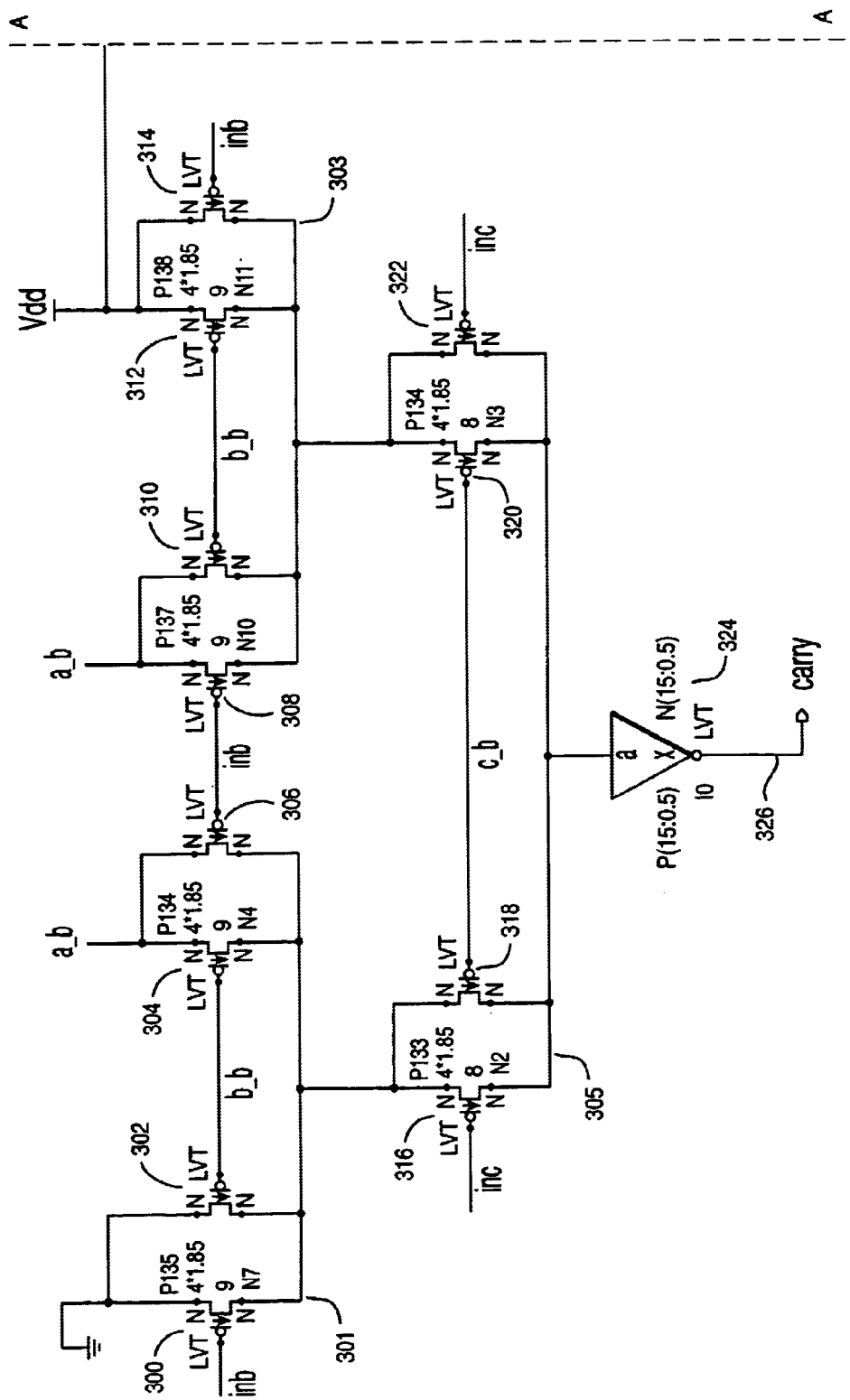
FIG. 6 (comprised FIGS. 6A–6B) is a diagram showing another embodiment of a carry circuit using transmission gate logic in accordance with the present invention.
Figure 6B:
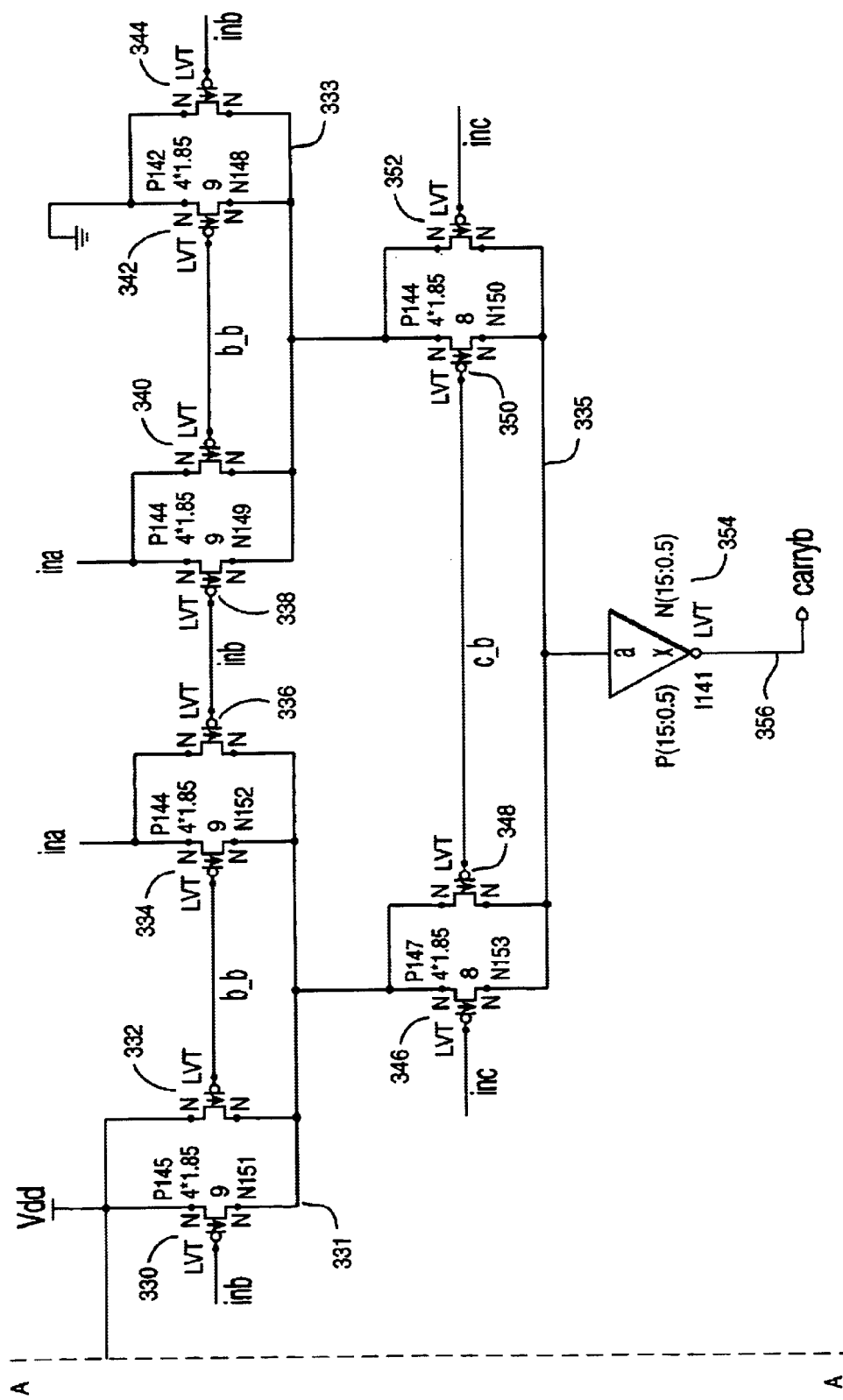

FIG. 6 shows a further embodiment of the present invention wherein transmission gate logic techniques are utilized to provide additional benefits. Those skilled in the art will appreciate that transmission gate logic includes one N type transistor and one P type transistor connected in parallel and controlled inverted gate voltages. This technology is known to provide faster speed operations than static circuit designs.

With reference to FIG. 6, a transmission gate logic carry and carry_ circuit is shown having six transmission gates, also known as pass gates, for the carry generation portion and six pass gates for the carry_ operation. An example will now be used to describe the operation of this circuit. For purposes of this example assume that a=1, b=1 and c=0. From Table 2, it can be seen that given these inputs, the carry output will be equal to a logical 1 and the carry_ will be a logical 0. N type transistor 300 will receive a logical 1 input (inb) with P device 302 having a logical 0 (b_) input thereto. This will cause node 301 to be pulled to ground through these transistors. At the same time, N type transistor 304 and P type transistor 306 will have a logical 0 and logical 1 input to their gates, receptively, causing both to be turned off. Thus, the logical 0 (a_) input to the source of transistors 304 and 306 will not have an electrically conductive path to node 301.

Transistor 308 (N type device) and transistor 310 (P type device) will have a logical 1 (inb) and logical 0 (b__) input to their gates, respectively. Thus, both of these devices will be turned on and provide a conductive path to node 303, which will be at ground potential, due to the logical 0 (a__) input to the sources of transistors 308 and 310. Transistor 312 is an N type device that will be turned off due to the logical 0 (b__) input to its gate. Correspondingly, P type device 314 will also be turned off due to the logical 1 (inb) input to its gate. Thus node 303 will remain at logical 0.

At the next level, N type transistor 316 will be turned off due to the logical 0 (inc) input to its gate. Further P transistor 318 will also be turned off due to the logical 1 input thereto (c__). Therefore, node 301 will not have a conductive path to node 305. However, N transistor 320 and P transistor 322 will both be turned on due to the logical 1 (c__) and logical 0 (inc) input to their gates, respectively. In this case, node 303 will have an electrically conductive path such that node 305 will be pulled to logical 0. Node 305 is input to inverter 324 and a logical 1 is output therefrom on node 326 which is the carry output.

N type transistor 330 will receive a logical 1 input (inb) with P device 332 having a logical 0 (b__) input thereto. This will cause node 331 to be pulled up to Vdd through these transistors. At the same time, N type transistor 334 and P type transistor 336 will have a logical 0 and logical 1 input to their gates, receptively, causing both to be turned off. Thus, the logical 1 (ina) input to the source of transistors 334 and 336 will not have an electrically conductive path to node 301.

Transistor 338 (N type device) and transistor 340 (P type device) will have a logical 1 (inb) and logical 0 (b__)input to their gates, respectively. Thus, both of these devices will be turned on and provide a conductive path to node 333, which will be at a logical 1, due to the input (ina) to the sources of transistors 338 and 340. Transistor 342 is an N type device that will be turned off due to the logical 0 (b__) input to its gate. Correspondingly, P type device 344 will also be turned off due to the logical 1 (inb) input to its gate. Thus node 333 will remain at logical 1.

At the next level, N type transistor 346 will be turned off due to the logical 0 (inc) input to its gate. Further P transistor 348 will also be turned off due to the logical 1 input thereto (c__). Therefore, node 331 will not have a conductive path to node 335. However, N transistor 350 and P transistor 352 will both be turned on due to the logical 1 (c__) and logical 0 (inc) input to their gates, respectively. In this case, node 333 will have an electrically conductive path such that node 335 will be pulled to logical 1. Node 335 is input to inverter 354 and a logical 0 is output therefrom on node 356 which is the carry__ output.

It should be noted that the carry and carry__ portions of the circuit of FIG. 6, which provide the dual rail characteristic of the present invention, are symmetrical with respect to one another. As discussed above, this will reduce the floating body effect associated with SOI circuits and enhance the performance of functional units (i.e. multiplier with CSAs) using this design.

Although certain preferred embodiments have been shown and described, it should be understood that many changes and modifications may be made therein without departing from the scope of the appended claims.

What is claimed is:

1. A static summing circuit for generating an arithmetic output, comprising:
    a first set of P type and N type transistor devices symmetrically connected to one another such that each said P type transistor has a corresponding N type transistor; and
    a second set of P type and N type transistor devices, symmetrically connected to one another such that each said P type transistor has a corresponding N type transistor said first set of devices and said second set of devices being formed on an insulating layer which introduces a floating body effect caused by said insulating layer wherein a varying voltage drop occurs across said first set of devices and said second set of devices;
    wherein said arithmetic output and a complement thereof are provided concurrently on respective output nodes of said circuit;
    wherein each of said P type transistors and said corresponding N type transistors in said first set of devices are concurrently in either a turned on or turned off state and each of said P type transistors and said corresponding N type transistors in said second set of devices are concurrently in either a turned on or turned off state, such that said floating body effect is minimized.

2. A circuit according to claim 1 wherein said circuit includes a third set of devices including both N type transistors and P type transistors.

3. A circuit according to claim 2 wherein each of said N type transistors in said third set of devices is associated with a corresponding P type transistor in said third set of devices.

4. A circuit according to claim 3 wherein each of said N type transistors in said third set of devices is off when said associated corresponding P type transistor in said third set of devices is turned on.

5. A circuit according to claim 4 wherein each of the P type transistors in said third set of devices is off when said associated corresponding N type transistor in said third set of devices is turned on.

6. A data processing system, comprising:
    a memory;
    a central processing unit;
    at least one execution unit included within said central processing unit for performing arithmetic and logical operations;
    an arithmetic circuit within said at least one execution unit which performs arithmetic operations on data stored in said memory;
    at least one adder circuit included in said arithmetic circuit that receives plural input signals and generates a sum thereof;
    wherein said at least one adder includes a static circuit for generating an arithmetic output, including:
        a first set of P type and N type transistor devices;
        a second set of P type and N type transistor devices, having a second switching characteristic, symmetrically connected to one another such that each said P type transistor has a corresponding N type transistor said first set of devices and said second set of devices being formed on an insulating layer which introduces a floating body effect caused by said insulating layer wherein a varying voltage drop occurs across said first set of devices and said second set of devices such that said output and a complement thereof are provided concurrently on respective output nodes of said circuit;
    wherein each of said P type transistors and said corresponding N type transistors in said first set of devices are concurrently in either a turned on or turned off state and each of said P type transistors and said corresponding N type transistors in said second set of devices are concurrently in either a turned on or turned off state, such that said floating body effect is minimized.

7. A system according to claim 6 wherein said circuit includes a third set of device having both N type and P type transistors.

8. A system according to claim 7 wherein each of the N type transistors in said third set of devices is associated with a corresponding P type transistor in said third set of devices.

9. A system according to claim 8 wherein said N type transistors in said third set of devices is off when said associated corresponding P type transistor in said third set of devices is turned on and the P type transistors in said third set of devices are off when said associated corresponding N type transistor in said third set of devices is turned on.

10. A method of generating an arithmetic output from a static summing circuits, said method comprising the steps of:

providing a first set of P type and N type transistor devices symmetrically connected to one another such that each said P type transistor has a corresponding N type transistor; and symmetrically connecting a second set of P type and N type transistor devices, to one another such that each said P type transistor has a corresponding N type transistor wherein said first set of devices and said second set of devices are formed on an insulating layer which introduces a floating body effect caused by said insulating layer wherein a varying voltage drop occurs across said first set of devices and said second set of devices;

wherein said arithmetic output and a complement thereof are provided concurrently on respective output nodes of said circuit; and wherein each of said P type transistors and said corresponding N type transistors in said first set of devices are concurrently in either a turned on or turned off state and each of said P type transistors and said corresponding N type transistors in said second set of devices are concurrently in either a turned on or turned off state, such that said floating body effect is minimized.

11. A method according to claim 10, further comprising the steps of:

providing a third set of devices including both N type transistors and P type transistor; and associating each of said N type transistor in said third set of devices with a corresponding P type transistor in said third set of devices.

12. A method according to claim 11 further comprising the step of turning off said N type transistors in said third set of devices when said corresponding P type transistor in said third set of devices is turned on.

13. A method according to claim 11, further comprising the step of turning off said P type transistors in said third set of devices when said corresponding N type transistor in said third set of devices is turned on.

14. A static circuit for generating an arithmetic output, comprising:

a first set of N type transistor devices and P type transistor devices, said N type transistor devices and said P type transistor devices in said first set being symmetrically connected to one another;

a second set of N type transistor devices and P type transistor devices, said N type transistor devices and said P type transistor devices in said second set being symmetrically connected to one another; and a third set of N type transistor devices and P type transistor devices, said N type transistor devices and said P type transistor devices in said third set being symmetrically connected to one another;

wherein all of said N type transistor devices and said P type transistor devices in said first, second and third sets are formed on an insulating layer which introduces a floating body effect caused by said insulating layer wherein a varying voltage drop occurs across said devices in said first, second and third sets;

wherein the N type transistor devices and P type transistor devices in said first set and said second set are all in one of a turned on state or a turned off state at any given time period and wherein the N type transistor devices and P type transistor devices in said third set are in one of a turned on state or a turned off state respective to one another at any given time period to minimize said floating body effect; and wherein said arithmetic output and a complement thereof are provided concurrently on respective output nodes of said circuit.

\* \* \* \* \*